Patented Sept. 30, 1924.

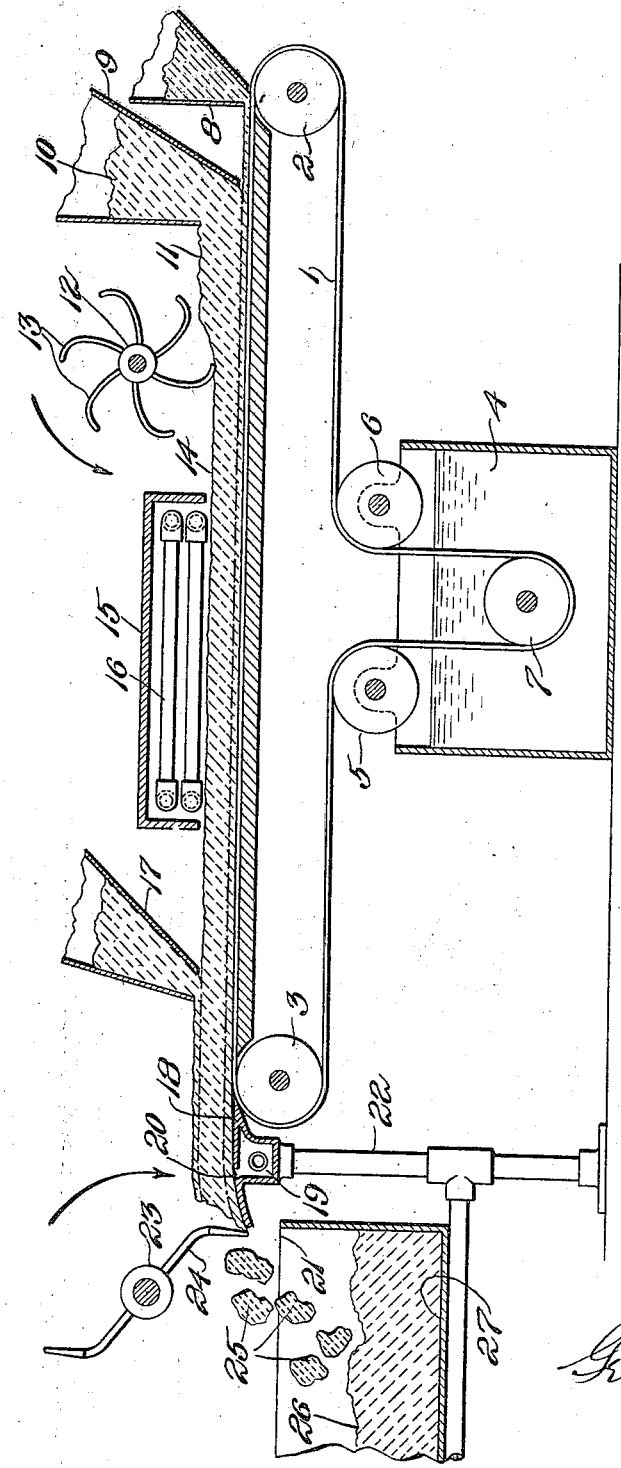

1,510,237

UNITED STATES PATENT OFFICE.

GEORGE H. MAXWELL, OF PHOENIX, ARIZONA.

APPARATUS FOR FORMING SHOE-BOTTOM FILLER.

Application filed February 14, 1921, Serial No. 500,711. Renewed March 17, 1924.

*To all whom it may concern:*

Be it known that I, GEORGE H. MAXWELL, a citizen of the United States, and resident of Phoenix, Arizona, have invented an Improvement in Apparatus for Forming Shoe-Bottom Fillers, of which the following description, in connection with the accompanying drawings, is a specification, like letters on the drawings representing like parts.

My present invention is for handling the kind of filler patented in Patent No. 861,555 of July 30, 1907. This kind of filler has heretofore always been put on the market in the form of loaves as shown in the drawing of Patent No. 832,002, of Sept. 25, 1906, to be used as described in Patent No. 808,224 of Dec. 26, 1905. and as further set forth in Patent No. 808,227 of Dec. 26 1905, but in this loaf form and subject to the use as set forth in said patents, the process was always quite slow and laborious due to the fact that the filler when in a compressed loaf or large mass is impervious to quick penetration by heat, the heat being able to attack only the outside of the loaf and that slowly which is rendered still slower by the character of the cork and the binder which necessitates low heat as the cork would char or lose its life or resiliency under a continued high heat. All of the aforesaid patents and their mutual relations in constituting a new system are further set forth in the Federal decisions contained in vol. 252 Federal Reporter, pages 148 to 176.

Accordingly my present invention aims to produce the filler ready for the market in the form of small fragments or fragmentary portions having a substantially non-compressed, open condition, so that later they may be readily and very quickly penetrated by heat and therefore melted in a fraction of the time possible heretofore.

To this end I have devised the hereinafter described apparatus, a preferred form of which is shown in the drawings. The drawings show the apparatus in side elevation, partly in section.

The conveyor belt 1 is mounted at its opposite ends on drive rolls 2 and 3 and preferably has a deflected portion arranged to descend into a water tank 4 over suitable rolls 5, 6, 7 to saturate the belt with water although this is only a preferable step in the procedure. At the ingoing end of the belt I provide a spout 8 leading from a hopper (not shown) for delivering a layer of cork to the top surface of the belt. Adjacent the spout 8 is a hopper 9 from a mixer (not shown) for delivering hot, melted filler 10 in a heap 11 to the belt on top of the layer of cork. A rotary device 12 having a series of arms or scoops 13 is arranged in the path of this heap so as to skim off the top thereof and leave a layer 14 of filler of the desired thickness in sheet form but without compression. The latter is the object of skimming off the top instead of spreading the filler under more or less compression to get it into sheet form. By removing the surplus filler so as to leave the desired amount only, I avoid compressing and densifying the sheet of filler. As the sheet 14 of filler proceeds under the forward movement of the belt it passes preferably under a cooling apparatus 15 which may be of any desired form capable of removing the heat rapidly, such as refrigerating pipes 16. Arrived at the opposite end above the roll 3 by which time the sheet of filler has become rigid or substantially set and coherent, it is dusted on its top surface with dry cork from the spout 17 and then meets the front edge 18 of a stripper plate just back of which is preferably a pipe or vent 19 for delivering a blast of dry cork through its open mouth 20 against the under side of the filler as the latter moves onto a stationary plate or narrow table 21 at the upper end of the stand 22. As the filler moves slowly over this plate 21 a rotary, fork-like cutter device 23 strikes the filler, said device having its arms or forks 24 moving slightly faster than the filler so as to tear the latter away from the sheet in the form of fragments as indicated at 25. These fragments fall into a mass of dry cork 26 where they may be agitated by hand or otherwise in a receptacle 27. They are then ready for packing for shipment.

In use the belt 1 travels at a slow speed and is put in such a condition at once that the hot filler will not stick to it. This is accomplished by rendering the belt wet by passing through the water tank 4 and by the superposed layer of cork,—one or both, both being preferable for best results. Then the mass of filler 10 is deposited from the hopper 9 in a heap 11 and its upper surface portion skimmed off and thrown back by the arms 13 of the rotary device 12 thereby leaving a thin sheet 14 in position on the cork layer so as to be readily cooled by the cooling device 15 and by the time it reaches the further end of the belt above the roll 3 it is stiff and coherent so that it may be stripped from the belt by the knife edge 18 previously having been dusted on its top surface with dry cork. A blast of dry cork is driven under the sheet at the point 20 from the tube or delivery device 19 so as to render it impossible for any fragment of the filler to stick to the plate 21 and as the sheet escapes over the outgoing edge of the plate it is caught and torn off by the claws or arms 24 of the rotary cutting device 23, said arms or claws being prevented from sticking to the filler by the top surface of dry cork thereon, and thence falls into the receptacle 27 in the form of fragments 25 to be further dusted or coated by dry cork 26.

This application is one of several concurrent and copending applications which together constitute a new system of handling and using shoe-bottom filler for and in connection with shoe-manufacture. My applications Serial Nos. 560,800, 633,148, 656,496, and 656,497 cover the machine for use in the shoe factory in applying to the shoe bottom the filler formed by the apparatus of the present application; Serial No. 584,879 is a division of the present case and covers the shoe-bottom filler-mass as an article of manufacture and the process of making said filler; and Serial No. 500,709 covers the process of the application of said filler to the shoe-bottom in the shoe factory; while the preferred type of filler (and the method of making) best adapted to all the foregoing is covered in Patents Nos. 1,032,312 and 1,121,688, the broad process of using in Patents Nos. 1,118,161 and 1,227,502, and the machine for using (considered broadly in certain respects), in Patent No. 1,225,372.

My invention is further defined and set forth in the following claims:

1. The herein described apparatus, comprising a support, means to deposit a thick layer of hot, viscous, granular filler on said support, means to remove the upper portion of said layer without compression to leave a thin layer, provision to cool said thin layer, and means to sever said thin layer into fragments without compression.

2. The herein described apparatus, comprising a support, means to deposit a thick layer of hot, sticky, shoe-bottom filler on said support, means to prevent said filler sticking to said support, means to remove the upper portion of said layer to leave a thin uncompressed layer, provision to cool said thin layer, and means to sever said thin layer into substantially uncompressed fragments.

3. The herein described apparatus, comprising a support, means to deposit a layer of ground cork on said support, means to deposit a thick layer of filler on said layer of ground cork on said support, means to remove the upper portion of said layer to leave a thin uncompressed layer, provision to cool said thin layer, and means to sever said thin layer into fragments.

4. The herein described apparatus for handling hot, sticky, shoe-bottom filler, comprising a support, means to wet the top surface of said support sufficiently to prevent adhesion thereto of said filler, means to deposit a thick layer of said hot filler on said support, means to remove the upper portion of said layer without compression to leave a thin layer, provision to cool said thin layer, and means to sever said thin layer without compression into fragments.

5. The herein described apparatus for handling hot, sticky, shoe-bottom filler, comprising a support, means to wet the top surface of said support sufficiently to prevent adhesion thereto of said filler, means to deposit a layer of ground cork on said wet support, means to deposit a thick layer of filler on said cork on said support, means to remove the upper portion of said layer to leave a thin layer, provision to cool said thin layer, and means to sever said thin layer into fragments.

6. The herein described apparatus, comprising a support, means to deposit a thick layer of filler on said support, means to remove the upper portion of said layer to leave a thin layer, provision to cool said thin layer, means to interpose a layer of ground cork beneath the cooled filler, and means to sever said thin layer into fragments.

7. The herein described apparatus, comprising a support, means to deposit a thick layer of filler on said support, means to remove the upper portion of said layer to leave a thin layer, provision to cool said thin layer, means to dust the top of said filler layer with ground cork, and means to sever said thin layer into fragments.

8. The herein described apparatus, comprising a support, means to deposit a thick layer of filler on said support, means to remove the upper portion of said layer without compression to leave a thin uncompressed layer, provision to cool said thin layer also without compression, means to strip said layer of filler from said support, and means to sever said thin layer into fragments, all of said steps being without compression.

9. The herein described apparatus, comprising a support, means to deposit a thick layer of filler on said support, means to remove the upper portion of said layer to leave a thin layer, provision to cool said thin layer, means to strip said layer of filler from said support, means to dust said layer both on top and underneath with ground cork, and means to sever said thin layer into fragments.

10. The herein described apparatus, comprising mechanism to provide a layer of filler, provision to cool said layer, and means to tear said layer into small fragments.

11. The subcombination of a support for receiving hot, granular, sticky, shoe-bottom filler when in a hot, semi-fluid condition, said support having a water absorbent receiving surface, water supplying means for charging said surface with water enough to prevent said hot filler from adhering to said surface, and means to deposit said hot filler on said wet surface.

12. The subcombination of a support for receiving hot, granular, sticky, shoe-bottom filler when in a hot, semi-fluid condition, said support having a water absorbent receiving surface, water supplying means for charging said surface with water enough to prevent said hot filler from adhering to said surface, and means to deposit said hot filler on said wet surface in a thin uncompressed layer.

In testimony whereof, I have signed my name to this specification, in the presence of two subscribing witnesses.

GEORGE H. MAXWELL.

Witnesses:
ANDREW THOMA,
OLIVER D. HOGUE.